US010158125B2

United States Patent
Morozumi et al.

(10) Patent No.: US 10,158,125 B2
(45) Date of Patent: Dec. 18, 2018

(54) SOLID POLYMER FUEL CELL AND SEPARATOR

(71) Applicants: Eiichirou Morozumi, Kariya (JP); Takatoshi Asaoka, Kariya (JP)

(72) Inventors: Eiichirou Morozumi, Kariya (JP); Takatoshi Asaoka, Kariya (JP)

(73) Assignee: TOYOTA SHATAI KABUSHIKI KAISHA, Aichi-Ken (JP)

( * ) Notice: Subject to any disclaimer, the term of this patent is extended or adjusted under 35 U.S.C. 154(b) by 104 days.

(21) Appl. No.: 15/511,610

(22) PCT Filed: Aug. 18, 2015

(86) PCT No.: PCT/JP2015/073138
§ 371 (c)(1),
(2) Date: Mar. 15, 2017

(87) PCT Pub. No.: WO2016/042961
PCT Pub. Date: Mar. 24, 2016

(65) Prior Publication Data
US 2017/0263949 A1    Sep. 14, 2017

(30) Foreign Application Priority Data

Sep. 17, 2014   (JP) .................................. 2014-189148

(51) Int. Cl.
*H01M 8/02* (2016.01)
*H01M 8/0254* (2016.01)
(Continued)

(52) U.S. Cl.
CPC ....... *H01M 8/0254* (2013.01); *H01M 4/8605* (2013.01); *H01M 4/96* (2013.01);
(Continued)

(58) Field of Classification Search
CPC ............ H01M 8/0254; H01M 8/0226; H01M 8/2465; H01M 8/0206; H01M 8/1018; H01M 8/0221; H01M 8/0228; H01M 8/10
See application file for complete search history.

(56) References Cited

U.S. PATENT DOCUMENTS

2004/0028980 A1\* 2/2004 Hashimoto ......... H01M 8/0206
429/492
2006/0110648 A1   5/2006 Lee et al.
(Continued)

FOREIGN PATENT DOCUMENTS

DE   102007005232 A   7/2008
EP     0955686 A   11/1999
(Continued)

OTHER PUBLICATIONS

Japanese Office Action for Application No. 2014-189148, dated Aug. 1, 2017 (English Translation—3 pgs, Japanese Office Action—4 pgs, 7 pgs. total).
(Continued)

*Primary Examiner* — Stewart A Fraser
(74) *Attorney, Agent, or Firm* — Patterson Thuente Pedersen, P.A.

(57) ABSTRACT

A fuel cell is formed by laminating a plurality of cells. Each cell includes a membrane electrode assembly and two separators, which hold the membrane electrode assembly in between. Each separator includes a base member made of a metal material. A first layer is provided on the surface of the base member. The first layer includes a resin film and conductive particles that have greater hardness than the oxide film of the base member. Between the separators that are adjacent to each other, the first layers are in contact with each other.

4 Claims, 4 Drawing Sheets

(51) Int. Cl.
    *H01M 8/10*     (2016.01)
    *H01M 8/2404*     (2016.01)
    *H01M 4/86*     (2006.01)
    *H01M 4/96*     (2006.01)
    *H01M 8/1018*     (2016.01)
    *H01M 8/2465*     (2016.01)
    *H01M 8/0206*     (2016.01)
    *H01M 8/0215*     (2016.01)
    *H01M 8/0221*     (2016.01)
    *H01M 8/0226*     (2016.01)
    *H01M 8/0228*     (2016.01)
    *H01M 8/0234*     (2016.01)

(52) U.S. Cl.
    CPC ....... *H01M 8/0206* (2013.01); *H01M 8/0215* (2013.01); *H01M 8/0221* (2013.01); *H01M 8/0226* (2013.01); *H01M 8/0228* (2013.01); *H01M 8/10* (2013.01); *H01M 8/1018* (2013.01); *H01M 8/2404* (2016.02); *H01M 8/2465* (2013.01); *H01M 8/0234* (2013.01); *H01M 2008/1095* (2013.01)

(56) References Cited

U.S. PATENT DOCUMENTS

| | | | |
|---|---|---|---|
| 2009/0053571 A1* | 2/2009 | Takata | H01M 8/0206 429/434 |
| 2009/0092872 A1* | 4/2009 | Miyazawa | H01M 8/0206 429/434 |
| 2009/0117431 A1* | 5/2009 | Obika | H01M 8/0206 429/465 |
| 2015/0140204 A1 | 5/2015 | Suzuki et al. | |
| 2015/0263357 A1 | 9/2015 | Morozumi et al. | |

FOREIGN PATENT DOCUMENTS

| | | |
|---|---|---|
| EP | 1094535 | 4/2001 |
| EP | 1227531 | 7/2002 |
| JP | 2000048833 | 2/2000 |
| JP | 2000260441 | 9/2000 |
| JP | 2001076740 | 3/2001 |
| JP | 2006-156385 A | 6/2006 |
| JP | 2009203502 | 9/2009 |
| WO | WO2014010491 | 1/2014 |
| WO | WO2015008838 | 1/2015 |

OTHER PUBLICATIONS

Extended European Search Report for EP 15842320.2, dated Mar. 2, 2018 (13 pgs).

IPRP for International Application PCT/JP2015/073138 dated Jun. 20, 2016.

International Search Report for International Application No. PCT/JP2015/073138 dated Nov. 17, 2015.

* cited by examiner

SOLID POLYMER FUEL CELL AND SEPARATOR

RELATED APPLICATIONS

The present application is a National Phase entry of PCT Application No. PCT/JP2015/073138, filed Aug. 18, 2015, which claims priority to JP 2014-189148, filed Sep. 17, 2014, all said applications being hereby incorporated herein by reference in their entireties.

TECHNICAL FIELD

The present invention relates to a solid polymer fuel cell formed by laminating cells and separators. Each cell includes a membrane electrode assembly and two separators, which hold the membrane electrode assembly in between.

BACKGROUND ART

Patent Document 1 discloses the configuration of a solid polymer fuel cell (hereinafter, abbreviated to fuel cell). In the fuel cell disclosed in Patent Document 1, a membrane electrode assembly includes an electrolyte film made of a solid polymeric membrane and two electrode catalytic layers. The electrode catalytic layers are respectively connected to the two surfaces of the electrolyte film. The membrane electrode assembly is held between two separators to form a cell. A fuel cell is then formed by laminating cells.

The separators of the fuel cell disclosed in Patent Document 1 include a base portion, which is formed of aluminum or steel sheet, and a coat layer, which is formed of titanium nitride and coats the base portion. In forming the coat layer on a surface of the base portion, a film forming technique such as physical vapor deposition (PVD) or chemical vapor deposition (CVD) is used.

PRIOR ART DOCUMENT

Patent Document

Patent Document 1: Japanese Laid-Open Patent Publication No. 2000-48833

SUMMARY OF THE INVENTION

In the case of the fuel cell disclosed in Patent Document 1, the coat layers of adjacent separators are in contact with each other. Thus, the contact resistance may be reduced. However, in this case, to form coat layers on the surfaces of a base portion (hereinafter, referred to as the base member), the film forming technique such as PVD or CVD needs to be used. In addition, an oxide film, which has great contact resistance, exists on the surface of aluminum or steel sheet included in the base member. Thus, before forming the coat layer, an oxide film needs to be eliminated by acid-cleaning the surface of the base member. This complicates the manufacturing process of the separators.

Accordingly, it is an objective of the present invention to provide a solid polymer fuel cell and separators that easily reduce the contact resistance between adjacent separators.

To achieve the objective, a solid polymer fuel cell is formed by laminating a plurality of cells. Each cell includes a membrane electrode assembly and two separators, which hold the membrane electrode assembly in between. Each separator includes a base member made of a metal material, and the base member includes an oxide film. A layer that includes a resin film and conductive particles that have greater hardness than the oxide film is provided on a surface of the base member of each separator. The solid polymer fuel cell includes a first separator and a second separator that are adjacent to each other. The layer provided on the base member of the first separator is in contact with the layer provided on the base member of the second separator.

According to the configuration, when cells are laminated, load in the laminating direction is applied to each separator. At this time, between the first separator and the second separator, which are in contact with each other, the conductive particles included in the layer provided on the base member of the first separator penetrate the oxide film of the base member and are in contact with the base material of the base member. At the same time, the conductive particles included in the layer provided on the base member of the second separator penetrate the oxide film of the base member and are in contact with the base material of the base member. The conductive particles of the first separator are in contact with the conductive particles of the second separator. Thus, the base material of the base member in the first separator, the conductive particles of the first separator, the conductive particles of the second separator, and the base material of the base member in the second separator form a conductive path that does not go through the oxide film.

To achieve the objective, a solid polymer fuel cell formed by laminating a plurality of cells. Each cell includes a membrane electrode assembly and two separators, which hold the membrane electrode assembly in between. Each separator includes a base member made of a metal material, and the base member includes an oxide film. The solid polymer fuel cell includes a first separator and a second separator that are adjacent to each other. A layer that includes a resin film and conductive particles that have greater hardness than the oxide film is provided on a surface of the base member of the first separator. The layer provided on the base member of the first separator is in contact with the base member of the second separator.

According to the configuration, when cells are laminated, load in the laminating direction is applied to each separator. At this time, between the first separator and the second separator, which are in contact with each other, the conductive particles included in a layer provided on the base member of the first separator penetrate the oxide film of the base member and are in contact with the base material of the base member. At the same time, the conductive particles penetrate the oxide film of the base member in the second separator and are in contact with the base material of the base member. Thus, the base material of the base member in the first separator, the conductive particles of the first separator, and the base material of the base member in the second separator form a conductive path that does not go through the oxide film.

Further, to achieve the objective, a separator is applied to a solid polymer fuel cell. The separator comprises a base member that is made of a metal material and includes an oxide film. At least one of an outermost surface on an upper side and an outermost surface on a lower side of the separator is constituted by a layer including a resin film and conductive particles that have greater hardness than the oxide film.

According to the configuration, when separators of adjacent cells are laminated on each other, if layers provided on the base members of the first separator and the second separator, which are adjacent to each other, are in contact with each other, the conductive particles included in the layer provided in the first separator penetrate the oxide film of the base member and are in contact with the base material of the base member. At the same time, the conductive particles included in the layer provided in the second separator penetrate the oxide film of the base member and are in contact with the base material of the base member. Furthermore, the conductive particles of the first separator are in contact with the conductive particles of the second separator. Thus, the base material of the base member in the first separator, the conductive particles of the first separator, the conductive particles of the second separator, and the base material of the base member in the second separator form a conductive path that does not go through the oxide film.

EFFECTS OF THE INVENTION

According to the present invention, the contact resistance between adjacent separators is easily reduced.

DETAILED DESCRIPTION OF THE PREFERRED EMBODIMENTS

Figure 1:
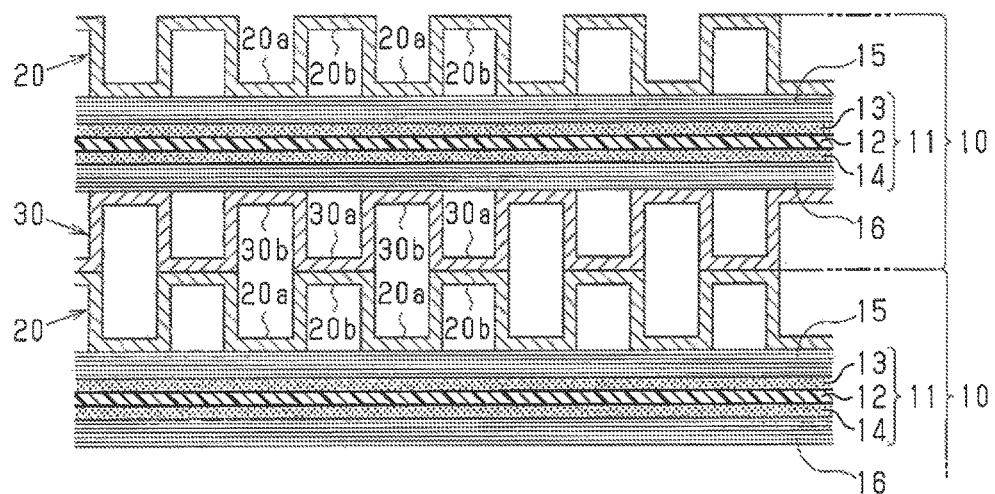
FIG. 1 is a cross-sectional view of a fuel cell according to one embodiment, mainly illustrating a cell.

With reference to FIGS. 1 to 7, a solid polymer fuel cell (hereinafter, abbreviated to fuel cell) and separators according to one embodiment will now be described.

The fuel cell is formed by laminating cells 10. Each cell 10 includes a membrane electrode assembly 11 and two separators 20 and 30, which hold the membrane electrode assembly 11 in between. The membrane electrode assembly 11 includes an electrolyte film 12, which is made of a solid polymeric membrane, and two electrode catalytic layers 13 and 14, which hold the electrolyte film 12 in between, and is referred to as a membrane electrode assembly (MEA). The first electrode catalytic layer 13 functions as a fuel terminal, and the second electrode catalytic layer 14 functions as an air terminal.

Gas diffusion layers 15 and 16, which are formed of carbon fiber, are placed between the membrane electrode assembly 11 and the respective separators 20 and 30. The gas diffusion layers 15 and 16 according to the present embodiment are formed of carbon paper.

Figure 2:
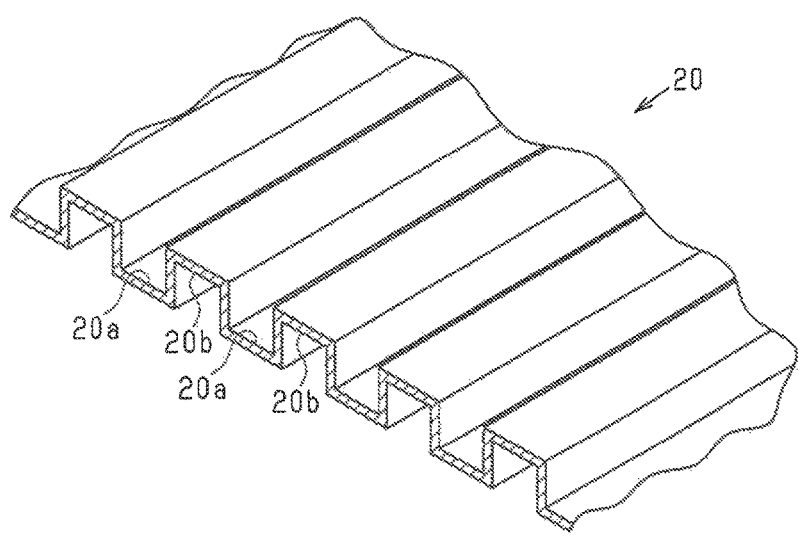
FIG. 2 is a perspective view of a first separator of the fuel cell shown in FIG. 1.

As shown in FIGS. 1 and 2, recessed grooves 20a and 20b alternately extend on the respective upper and lower faces of the first separator 20. The second recessed grooves 20b on the lower side face the membrane electrode assembly 11 and constitute flow paths through which fuel gas, e.g., hydrogen gas and the like, flows. The back surfaces of the first recessed grooves 20a on the upper side are in contact with the first gas diffusion layer 15. In other words, the lower face of the first separator 20 is in contact with the first gas diffusion layer 15.

As shown in FIG. 1, recessed grooves 30a and 30b alternately extend on the respective upper and lower faces of the second separator 30. The first recessed grooves 30a on the upper side face the membrane electrode assembly 11 and constitute flow paths through which oxidant gas, e.g., air, flows. The back surfaces of the second recessed grooves 30b on the lower side are in contact with the second gas diffusion layer 16. In other words, the upper face of the second separator 30 is in contact with the second gas diffusion layer 16.

The back surfaces of the second recessed grooves 20b on the lower side of the first separator 20 are in contact with the back surfaces of the first recessed grooves 30a on the upper side of the second separator 30. In other words, the upper face of the first separator 20 is in contact with the lower face of the second separator 30. Spaces with closed cross sections are formed by the first recessed grooves 20a on the upper side of the first separator 20 and the second recessed grooves 30b on the lower side of the second separator 30. The spaces constitute flow paths through which coolant flows.

Figure 3:
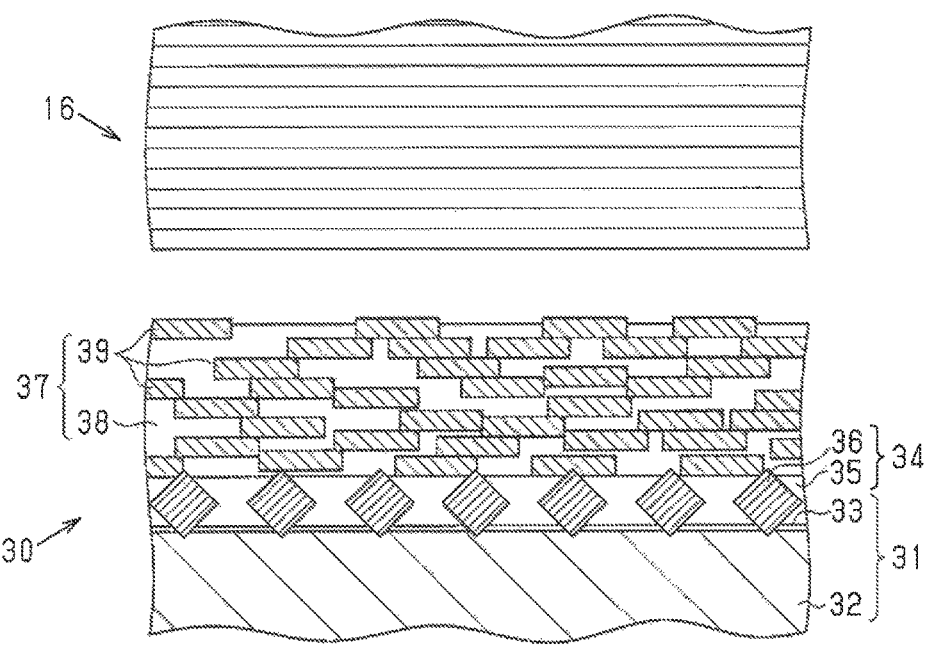
FIG. 3 is a cross-sectional view of the contact portion between a second separator and a second gas diffusion layer of the fuel cell shown in FIG. 1 in a state in which the second separator and the second gas diffusion layer are separated from each other.
Figure 4:
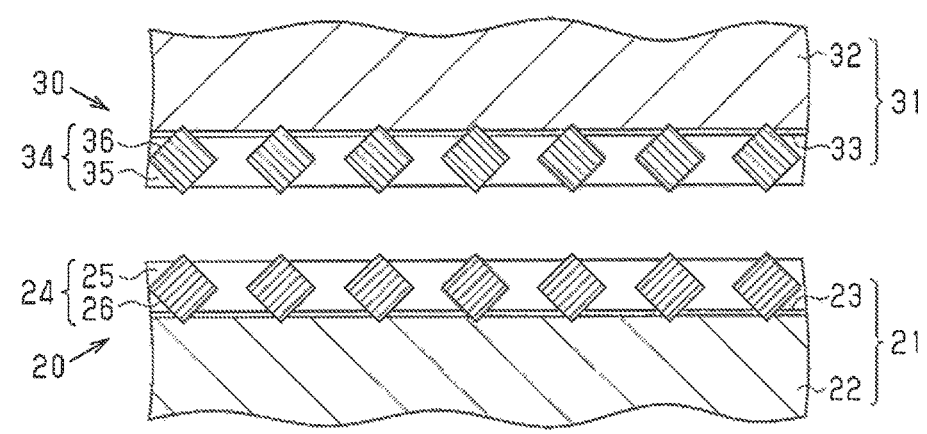
FIG. 4 is a cross-sectional view of the contact portion between the first separator and the second separator of the fuel cell shown in FIG. 1 in a state in which the first separator and the second separator are separated from each other.

As shown in FIGS. 3 and 4, each separator 20, 30 has a base member 21, 31 made of a metal material. The base member 21, 31 according to the present embodiment is formed of titanium.

As shown in FIG. 3, in the upper face of the second separator 30, which is in contact with the second gas diffusion layer 16, a first layer 34 is provided on the surface of the base member 31, and a second layer 37 as the outermost layer is provided on the surface of the first layer 34. In other words, the outermost surface on the upper side of the second separator 30 is constituted by the second layer 37. Therefore, in the second separator 30, the second layer 37 is in contact with the second gas diffusion layer 16.

The first layer 34 includes a resin film 35, which is made of thermosetting resin such as epoxy resin, and conductive particles 36, which are combined with the base member 31 via the resin film 35. The conductive particles 36 have greater hardness than the oxide film 33 of the base member 31. The conductive particles 36 according to the present embodiment are titanium nitride. The thickness of the resin film 35 is set to be less than the maximum agglomerated particle diameter of the conductive particles 36. The conductive particles 36 penetrate the oxide film 33 and are in contact with the base material 32 while projecting outside the resin film 35. Agglomerated particles are an agglomeration of the conductive particles 36 that are in contact with each other without solvent or resin. The maximum agglomerated particle diameter is the maximum value of the diameters of the agglomerated particles.

The second layer 37 includes a resin film 38, which is made of thermosetting resin such as epoxy resin, and powdery graphite 39, which is combined with the first layer 34 via the resin film 38. The graphite 39 on the inner side of the second layer 37 is in contact with the conductive particles 36.

In the present embodiment, the first layer 34 and the second layer 37 are formed in the following manner. First, a first paint, which includes the conductive particles 36, epoxy resin, and solvent, is applied to the surface of the base member 31. The first paint includes, e.g., methyl ethyl ketone and butyl diglycol (butyl carbitol). Next, a second paint, which includes, e.g., graphite 39 and solvent such as hexane, is applied to the surface of the base member 31, to which the first paint is applied. Then, pressure is applied to the surface of the base member 31, to which the first and second paints are applied. At the same time, the surface of the base member 31 is heated to a temperature at which these paints are hardened. With this, the conductive particles 36 penetrate the oxide film 33 of the base member 31 to be in contact with the surface of the base material 32, and epoxy resin is hardened so that the resin film 35 is formed. The conductive particles 36 and the base material 32 are fixed by the resin film 35 while the conductive particles 36 and the base material 32 are in contact with each other. At this time, some of epoxy resin flows out to the interspace of the graphite 39 and is hardened to form the resin film 38. The graphite 39 is then combined with the first layer 34 via the resin film 38.

Meanwhile, as shown in FIG. 4, in the lower face of the second separator 30, which is in contact with the first separator 20, only the first layer 34 is provided in the surface of the base member 31. In other words, the outermost surface on the lower side of the second separator 30 is constituted by the first layer 34. Therefore, in the second separator 30, the first layer 34 is in contact with the first separator 20.

Figure 5:
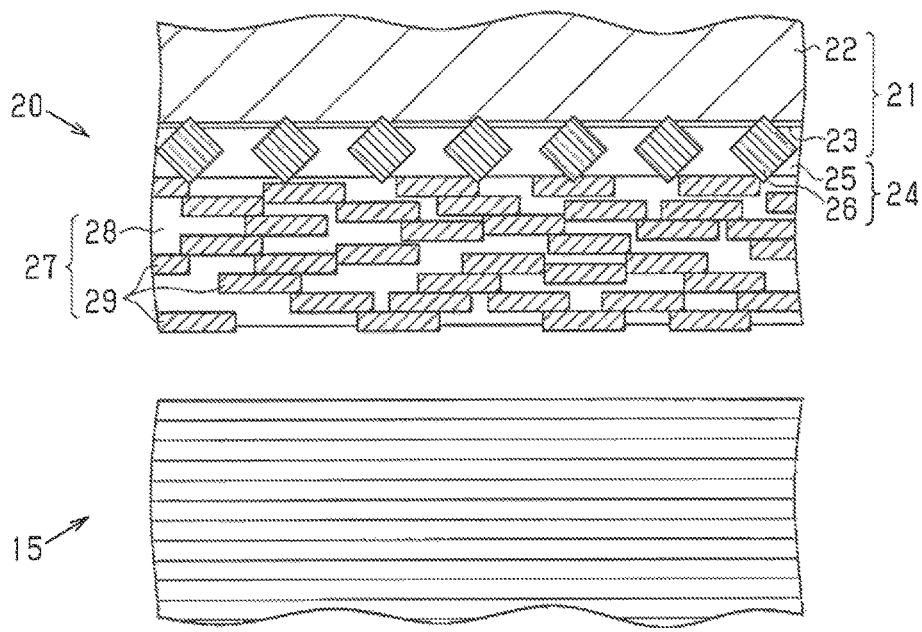
FIG. 5 is a cross-sectional view of the contact portion between the first separator and the first gas diffusion layer of the fuel cell shown in FIG. 1 in a state in which the first separator and the first gas diffusion layer are separated from each other.

As shown in FIG. 5, in the lower face of the first separator 20, which is in contact with the first gas diffusion layer 15, similar to the second separator 30, a first layer 24 is provided on the surface of the base member 21, and a second layer 27 as the outermost layer is provided on the surface of the first layer 24. In other words, the outermost surface on the lower side of the first separator 20 is constituted by the second layer 27. Therefore, in the first separator 20, the second layer 27 is in contact with the first gas diffusion layer 15.

The first layer 24 includes a resin film 25, which is made of thermosetting resin such as epoxy resin, and conductive particles 26, which are combined with the base member 21 via the resin film 25. The conductive particles 26 have greater hardness than the oxide film 23 of the base member 21. The conductive particles 26 according to the present invention are titanium nitride. The thickness of the resin film 25 is set to be smaller than the maximum agglomerated particle diameter of the conductive particles 26. The conductive particles 26 penetrate the oxide film 23 and are in contact with the base material 22 while projecting outside the resin film 25. Agglomerated particles are an agglomeration of the conductive particles 26 that contact each other without solvent or resin. The maximum agglomerated particle diameter is the maximum value of the diameters of the agglomerated particles.

The second layer 27 includes a resin film 28, which is made of thermosetting resin such as epoxy resin, and powdery graphite 29, which is combined with the first layer 24 via the resin film 28. The graphite 29 on the inner side of the second layer 27 is in contact with the conductive particles 26.

The method for forming the first layer 24 and the second layer 27 in the first separator 20 is the same as the method for forming the first layer 34 and the second layer 37 in the second separator 30.

As shown in FIG. 4, in the back surfaces of the second recessed grooves 20b on the lower side of the first separator 20, i.e., the upper surfaces, which are in contact with the second separator 30, only the first layer 24 is arranged on the surface of the base member 21. In other words, the outermost surface on the upper side of the first separator 20 is constituted by the first layer 24. Therefore, in the first separator 20, the first layer 24 is in contact with the second separator 30.

Operation of the present embodiment will now be described based on comparison with comparative examples.

The configuration of a first separator 120 and a second separator 130 in a first comparative example will now be described.

Figure 6:
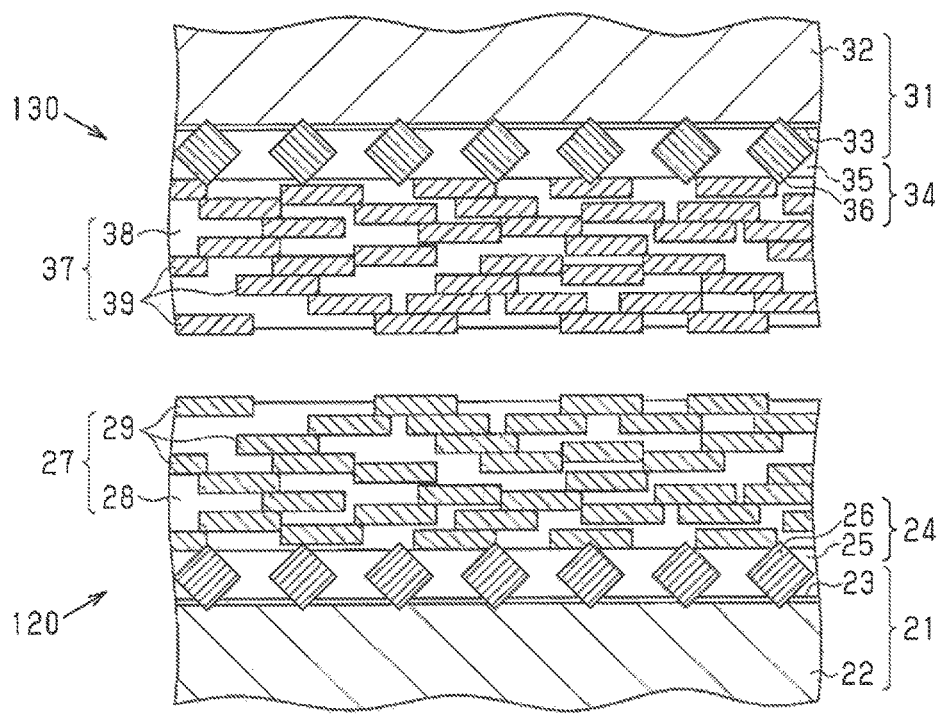
FIG. 6 is a cross-sectional view of the contact portion between a first separator and a second separator in a first comparative example in a state in which the first separator and the second separator are separated from each other.

As shown in FIG. 6, in the face of the first separator 120 that is in contact with the second separator 130, the first layer 24 and the second layer 27 are provided on the surface of the base member 21. In the face of the second separator 130 that is in contact with the first separator 120, the first layer 34 and the second layer 37 are provided on the surface of the base member 31. Therefore, between the first separator 120 and the second separator 130, which are adjacent to each other, the second layers 27 and 37 are in contact with each other.

The configuration of a second separator 230 in a second comparative example will now be described.

Figure 7:
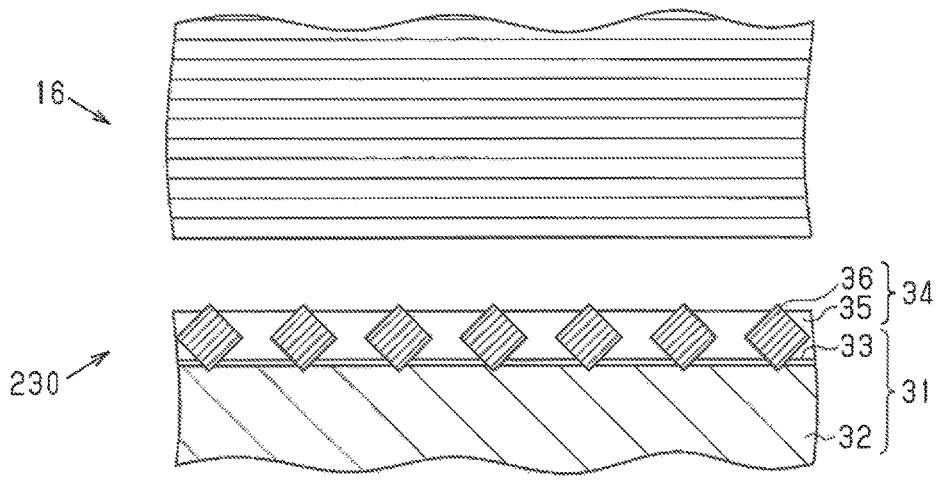
FIG. 7 is a cross-sectional view of the contact portion between a second separator and a second gas diffusion layer in a second comparative example in a state in which the second separator and the second gas diffusion layer are separated from each other.

As shown in FIG. 7, in the face of the second separator 230 that is in contact with the second gas diffusion layer 16, only the first layer 34 is provided on the surface of the base member 31. Therefore, in the second separator 230, the first layer 34 is in contact with the second gas diffusion layer 16.

The configurations of the first layers 24 and 34 and the second layers 27 and 37 are the same as those described above according to the present embodiment. Thus, like reference numerals designate like or corresponding parts, and overlapping description will be omitted.

TABLE 1

| Components of contact resistance | code |
|---|---|
| Interfacial resistance between base member (A) and conductive particles (B) | r(A, B) |
| Specific resistance of conductive particles (B) | R(B) |
| Interfacial resistance between conductive particles (B) and graphite (C) | r(B, C) |
| Specific resistance of graphite (C) | R(C) |
| Interfacial resistance between graphite (C) and gas diffusion layer (D) | r(C, D) |
| Interfacial resistance between layers of graphite (C) | r(C, C) |
| Interfacial resistance between layers of conductive particles (B) | r(B, B) |
| Interfacial resistance between conductive particles (B) and gas diffusion layer (D) | r(B, D) |

Table 1 defines the components of the contact resistance between the first separator 20, 120 and the corresponding second separator 30, 130 and the contact resistance between the separators 20, 30, 120, 130, 230 and the corresponding gas diffusion layer 15, 16.

In the present embodiment, the contact resistance between the second separator 30 and the second gas diffusion layer 16 can be expressed by the following expression (1), and the measured result was 3.1 (m$\Omega \cdot$cm$^2$).

$$r(A,B)+R(B)+r(B,C)+R(C)+r(C,D) \qquad (1)$$

In the second layer 37, the interfacial resistance between layers of graphite 39 is small enough to ignore. Thus, it is omitted from the above expression (1). Similarly, in the present embodiment, the contact resistance between the first separator 20 and the first gas diffusion layer 15 can be expressed by the expression (1).

In the second comparative example, the contact resistance between the second separator 230 and the second gas diffusion layer 16 can be expressed by the following expression (2), and the measured result was 7.7 (m$\Omega \cdot$cm$^2$).

$$r(A,B)+R(B)+r(B,D) \qquad (2)$$

Comparison between the above expressions (1) and (2) indicates that the reason why the contact resistance of the second comparative example is greater than the contact resistance of the present embodiment is because r(B, D) is large as compared to the other components. This agrees with the general tendency that the interfacial resistance between the different kinds of materials is greater than the interfacial resistance between the same kinds of materials.

The contact resistance between the first separator 20 and the second separator 30 the present embodiment can be expressed by the following expression (3), and the measured result was 1.3 (m$\Omega \cdot$cm$^2$).

$$\{r(A,B)+R(B)\} \times 2+r(B,B) \qquad (3)$$

In the first comparative example, the contact resistance between the first separator 120 and the second separator 130 can be expressed by the following expression (4), and the measured result was 7.1 (m$\Omega \cdot$cm$^2$).

$$\{r(A,B)+R(B)+r(B,C)+R(C)\} \times 2+r(C,C) \qquad (4)$$

Comparison between the above expressions (3) and (4) indicates that, as the reason why the contact resistance of the first comparative example is large as compared to the contact resistance of the present embodiment, the following three factors may be present.

r(B, C) is large.
R(C) is large.
r(C, C) is large.

It is well known that the specific resistance R(C) of graphite (C) is sufficiently small. In addition, the measured result of the Interfacial resistance r(C, C) between layers of graphite (C) was about 1 (m$\Omega \cdot$cm$^2$). Therefore, the Interfacial resistance r(B, C) between the conductive particles (B) and the graphite (C) appears to be a primary factor to increase the contact resistance in the first comparative example.

As above, according to the present embodiment, when cells 10 are laminated, load in the laminating direction is applied to each separator 20, 30. At this time, a conductive path that does not go through the oxide films 23 and 33 is formed between the first separator 20 and the second separator 30, which are adjacent to each other, by the base material 22 of the base member 21 in the first separator 20, the conductive particles 26 of the first separator 20, the conductive particles 36 of the second separator 30, and the base material 32 of the base member 31 in the second separator 30. In addition, as described above, an interfacial surface does not exist between the conductive particles 26, 36 and the graphite 29, 39. Therefore, the contact resistance between the first separator 20 and the second separator 30, which are adjacent to each other, can be easily reduced.

The graphite 29, 39 of the second layer 27, 37, which is provided on the surface of each separator 20, 30, contacts the corresponding gas diffusion layer 15, 16, which is formed of carbon fiber. In other words, the interfacial surface between the gas diffusion layer 15, 16 and the corresponding separator 20, 30 is an interfacial surface in which the same kinds of carbon-based materials are in contact with each other. Thus, the interfacial resistance is small. For this reason the contact resistance between the gas diffusion layer 15, 16 and the corresponding separator 20, 30 can be reduced.

The solid polymer fuel cell and the separator according to the present embodiment, which is described above, provide the following advantages.

(1) The first layers 24 and 34 are in contact with each other between the first separator 20 and the second separator 30, which are adjacent to each other.

According to such a configuration, the base material 22 of the base member 21 in the first separator 20, the conductive particles 26 of the first separator 20, the conductive particles 36 of the second separator 30, and the base material 32 of the base member 31 in the second separator 30 form a conductive path that does not go through the oxide films 23 and 33. Therefore, the contact resistance between the first separator 20 and the second separator 30, which are adjacent to each other, can be easily reduced, so that the internal resistance of the fuel cell is reduced.

The second layers 27 and 37 are not provided on the upper face of the first separator 20 that is in contact the second separator 30 and the lower face of the second separator 30 that is in contact with the first separator 20. Thus, the amount of graphite 29 and 39 used for the second layers 27 and 37 can be reduced.

(2) The thickness of the resin film 25, 35 of the first layer 24, 34 is set to be smaller than the maximum agglomerated particle diameter of the conductive particles 26, 36. This makes it easier for one block of agglomerated particles to contact both the base material 22 of the base member 21 of the first separator 20 and the conductive particles 36 contained in first layer 34 of the second separator 30. Therefore, the contact resistance between the first separator 20 and the second separator 30, which are adjacent to each other, can be effectively reduced.

(3) The first layer 24, 34 is provided on the face of the base member 21, 31 that faces the gas diffusion layer 15, 16, and the second layer 27, 37, which contains graphite 29, 39, is formed on the surface of the first layer 24, 34. Then, the second layer 27, 37 is in contact with the gas diffusion layer 15, 16.

According to such a configuration, the interfacial surface between the gas diffusion layer 15, 16 and each separator 20, 30 is an interfacial surface in which the same kinds of carbon-based materials are in contact with each other. Thus, the interfacial resistance is small. For this reason, the contact resistance between the gas diffusion layer 15, 16 and each separator 20, 30 can be reduced.

In addition, the surface of the first layer 24, 34 is covered by the second layer 27, 37, which contains the soft graphite 29, 39. Thus, the gas diffusion layer 15, 16 is less likely to be damaged. Therefore, the durability of the fuel cell is improved.

The above-illustrated embodiment may be modified in the following forms.

The gas diffusion layer 15, 16 may be formed of carbon cloth, which is woven fabric of carbon fiber.

The thickness of the resin film 25, 35 of the first layer 24, 34 may be set to be greater than the maximum agglomerated particle diameter of the conductive particles 26, 36. It is not necessary to form the conductive particles 26, 36 to be uniform.

Figure 8A:
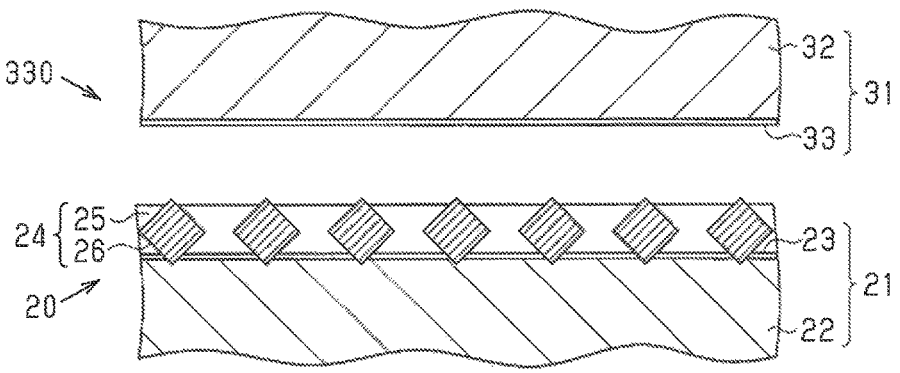
FIG. 8A is a cross-sectional view of the contact portion between a first separator and a second separator of a fuel cell in a modification in a state in which the first separator and the second separator are separated from each other.
Figure 8B:
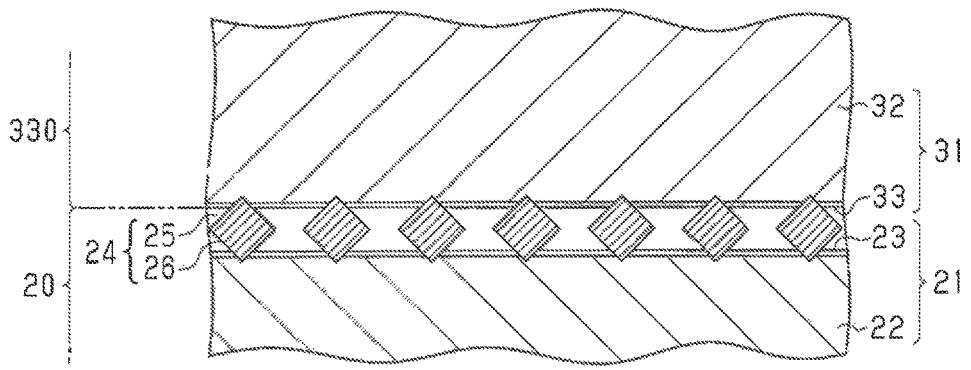
FIG. 8B is a cross-sectional view of the first separator and the second separator of the fuel cell in the modification of FIG. 8A, illustrating a state in which the first separator and the second separator are in contact with each other.

As shown in FIGS. 8A and 8B, the first layer 34 and the second layer 37 of a second separator 330 may be omitted, and it may be configured such that the first layer 24 of the first separator 20 is in contact with the base member 31 of the second separator 330 between the first separator 20 and the second separator 330 that are adjacent to each other.

In this case, when cells 10 are laminated, load in the laminating direction is applied to each separator 20, 330. At this time, as shown in FIG. 8B, conductive particles 26 penetrate the oxide film 33 of the base member 31 of the second separator 330 and contact the base material 32 of the base member 31 between the first separator 20 and the second separator 330, which are in contact with each other. Thus, the base material 22 of the base member 21 of the first separator 20, the conductive particles 26, and the base material 32 of the base member 31 in the second separator 330 form a conductive path that does not go through the oxide films 23 and 33. Therefore, the advantage similar to the above-illustrated embodiment is provided.

The base member of each separator may be formed of other metal materials such as stainless steel.

The conductive particles may be modified to other particles such as carbon black.

DESCRIPTION OF REFERENCE. NUMERALS

10 . . . cell, 11 . . . membrane electrode assembly, 12 . . . electrolyte film, 13 . . . first electrode catalytic layer, 14 . . . second electrode catalytic layer, 15 . . . first gas diffusion layer, 16 . . . second gas diffusion layer, 20 . . . first separator, 20a, . . . first recessed groove, 20b . . . second recessed groove, 21 . . . base member, 22 . . . base material, 23 . . . oxide film, 24 . . . first layer, 25 . . . resin film, 26 . . . conductive particle, 27 . . . second layer, 28 . . . resin film, 29 . . . graphite, 30 . . . second separator, 31 . . . base member, 32 . . . base material, 33 . . . oxide film, 34 . . . first layer, 35 . . . resin film, 36 . . . conductive particle, 37 . . . second layer, 38 . . . resin film, 39 . . . graphite.

The invention claimed is:

1. A solid polymer fuel cell formed by laminating a plurality of cells, each cell including a membrane electrode assembly and two separators, which hold the membrane electrode assembly in between, wherein:
    each separator includes a base member made of a metal material,
    the base member includes an oxide film,
    a layer that includes a resin film and conductive particles that have greater hardness than the oxide film is provided on a surface of the base member of each separator,
    a thickness of the resin film is set to be smaller than a maximum agglomerated particle diameter of the conductive particles,
    the solid polymer fuel cell includes a first separator and a second separator that are adjacent to each other, and
    the layer provided on the base member of the first separator is in contact with the layer provided on the base member of the second separator.

2. A solid polymer fuel cell formed by laminating a plurality of cells, each cell including a membrane electrode assembly and two separators, which hold the membrane electrode assembly in between, wherein:
    each separator includes a base member made of a metal material,
    the base member includes an oxide film,
    the solid polymer fuel cell includes a first separator and a second separator that are adjacent to each other,
    a layer that includes a resin film and conductive particles that have greater hardness than the oxide film is provided on a surface of the base member of the first separator,
    a thickness of the resin film is set to be smaller than a maximum agglomerated particle diameter of the conductive particles, and
    the layer provided on the base member of the first separator is in contact with the base member of the second separator.

3. The solid polymer fuel cell according to claim 1, wherein
    a gas diffusion layer formed of a carbon-based material is placed between the membrane electrode assembly and each separator,
    the layer is a first layer, which is provided on a face of the base member that faces the gas diffusion layer,
    a second layer containing a carbon-based material is provided on a surface of the first layer, and
    the second layer and the gas diffusion layer are in contact with each other.

4. A separator that is applied to a solid polymer fuel cell, the separator comprising a base member that is made of a metal material and includes an oxide film,
    wherein at least one of an outermost surface on an upper side and an outermost surface on a lower side of the separator is constituted by a layer including a resin film and conductive particles that have greater hardness than the oxide film, and
    a thickness of the resin film is set to be smaller than a maximum agglomerated particle diameter of the conductive particles.

* * * * *